Aug. 1, 1967  J. J. COLEMAN  3,333,700
SELF-CLEANING SCREEN
Filed May 10, 1965  2 Sheets-Sheet 1
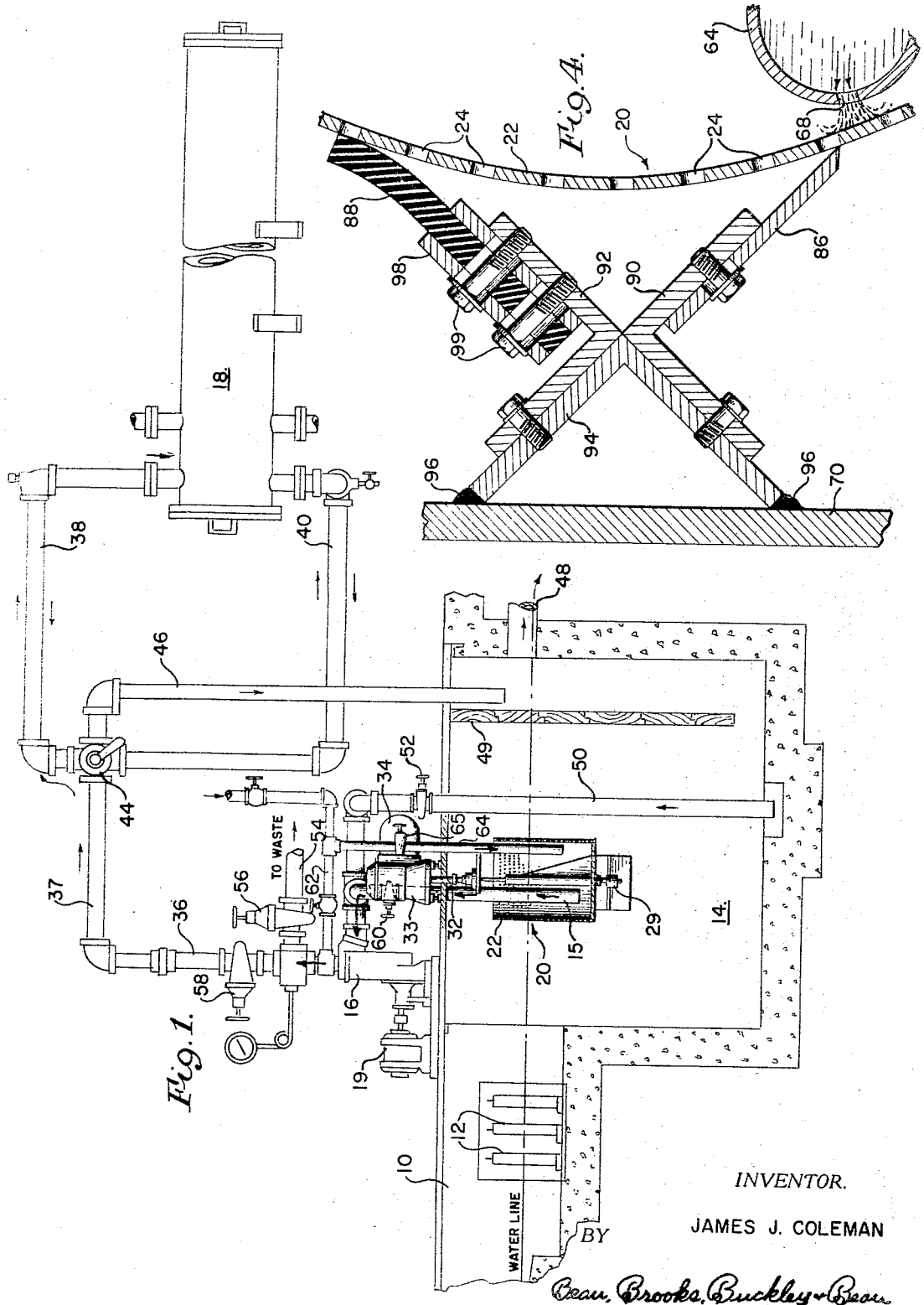
INVENTOR.
JAMES J. COLEMAN
BY
Beau, Brooks, Buckley & Beau
ATTORNEYS Aug. 1, 1967 J. J. COLEMAN 3,333,700
SELF-CLEANING SCREEN
Filed May 10, 1965 2 Sheets-Sheet 2

INVENTOR.
JAMES J. COLEMAN
BY
Bean, Brooks, Buckley & Bean
ATTORNEYS

United States Patent Office 3,333,700
Patented Aug. 1, 1967

3,333,700
SELF-CLEANING SCREEN
James J. Coleman, Stroudsburg, Pa., assignor to The
Patterson-Kelley Co., Inc., East Stroudsburg, Pa.
Filed May 10, 1965, Ser. No. 454,410
2 Claims. (Cl. 210—158)

ABSTRACT OF THE DISCLOSURE

A jet device operating also as a baffle for causing backwash of liquid through a screen in the region of an exterior scraper. A paddle assembly cooperates with the baffle to periodically supplement the jet action.

This invention relates to industrial screening devices, and more particularly to an improved system for screening pulp or other solids or semi-solids from industrial liquids while preventing clogging of the screen openings. The invention is particularly useful for example in conjunction with commercial laundry waste-water screening systems as disclosed in my earlier Patent 2,781,916 of February 19, 1957, because it solves the problem of laundry lint and soil disposal in improved manner.

In the accompanying drawing:

FIG. 1 is a combination vertical sectional and schematic view of a commercial laundry waste water screening and reclaiming system showing by way of example one form of the present invention;

FIG. 4 is a fragmentary section on enlarged scale taken along line 4—4 of FIG. 2.

As shown in FIG. 1, the invention may be employed in conjunction with a system for reclaiming heat from waste water, such as from a commercial laundry, textile plant, or the like. Thus, the waste water may be delivered to the system by means of a gutter as indicated at 10, into which may be fitted a set of "roughing" screens as indicated at 12 for preliminary screening of the waste water. The waste water then passes from the gutter 10 into a sump 14 from whence cleaned waste water is arranged to be picked up by a suction pipe 15 and pump 16 for delivery into a heat reclaimer as indicated at 18. The pump motor is indicated at 19.

Figure 2:
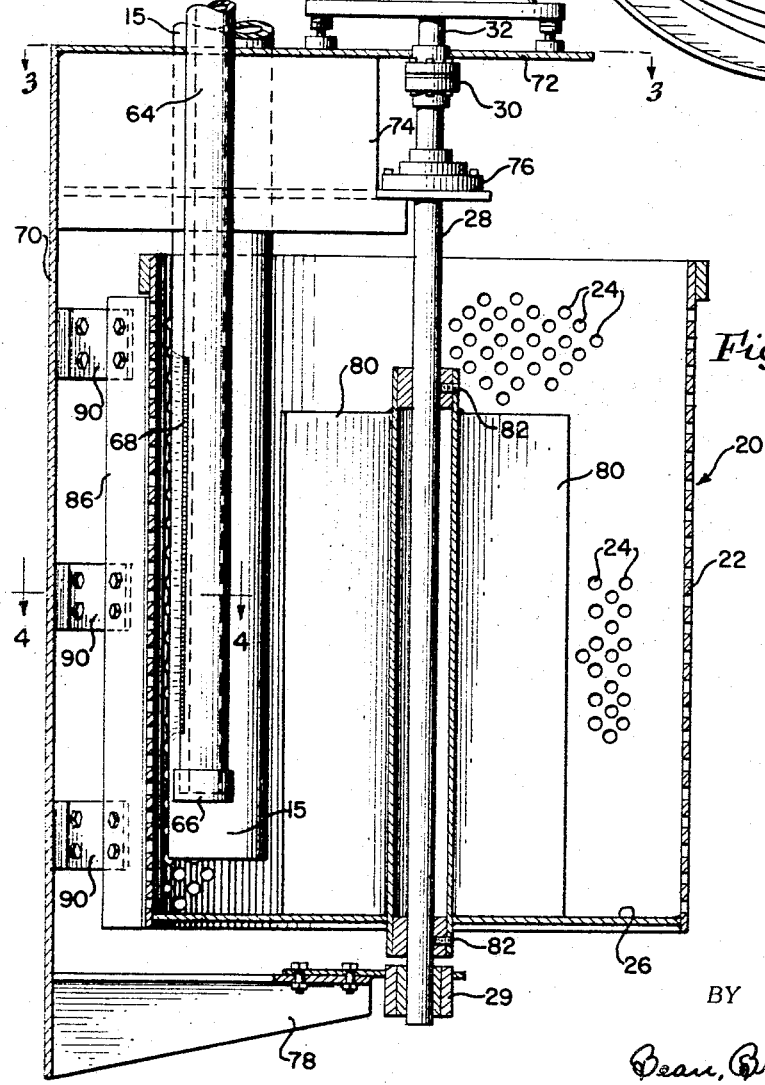
FIG. 2 is a fragmentary enlarged scale vertical sectional view through the screening device portion of the present invention.

In accord with the present invention, the intake conduit 15 for the pump 16 is arranged to terminate at its lower suction end portion near the bottom of a revolving "basket" type screen 20. The screen 20 as shown is of closed-bottom, open-top cylindrical form; the cylindrical side wall portion 22, of which is perforated as indicated at 24 (FIG. 2). The screen device 20 is closed at its bottom by plate 26 and may be conveniently mounted by means of a vertical central shaft 28 guided by a pedestal bearing 29 (supported from an adjacent wall structure of the sump 14 as shown in FIG. 2), the upper end of the shaft 28 being coupled as indicated at 30 to a drive shaft 32 extending from a gear box 33 driven by a motor as indicated at 34.

As shown in FIG. 1, by way of only one typical example of a waste water heat reclaiming system the pump 16 is arranged to discharge through a vertical conduit 36 leading through conduits, 37, 38 to the heat reclaimer 18. A back-wash conduit 40 is shown to lead out from the heat reclaimer, and the direction of flow is controlled by a three-way valve as indicated at 44 which is manually or automatically adjustable to electively divert the pump discharge through the heat reclaimer and thence through conduit 46, discharging into the overflow end portion of the tank 14, and thus to waste as indicated at 48. A vertical partition as shown at 49 is provided to separate the cooled overflow effluent portion from the relatively hot main body portion of the tank 14. To provide for periodic draining of the tank 14, a clean-out suction conduit is provided as shown at 50 in communication with the intake of the pump 16. Operation of the suction conduit 50 is manually controlled such as by means of a valve 52, and the pump delivery conduit 36 connects to a branch outlet 54 for discharging the clean-out material to waste. The conduit 54 is controlled by a valve 56 and the upstream end of the conduit 36 is controlled by a similar valve 58. Thus, it will be appreciated that whenever it is desired to clean out the tank 14, the valve 58 will be closed and the valves 52, 56 opened so that the pump will suck up the refuse material from the bottom of the tank 14 and deliver it to waste. A valve as indicated at 60 is provided to close the screened water intake 15, during such tank clean-out operation. The heat reclaimer and clean-out system hereinabove described is generally typical and illustrates one example of a system to which the present invention may be applied.

In accordance with the present invention the pump discharge conduit 36 is fitted with a bypass conduit 62 leading to a discharge pipe 64 which is manually controlled by means of a valve 65. Alternatively, the conduit 62 could be supplied from a fresh water source such as a typical municipal pressured water supply system. At its lower end the pipe 64 delivers into the screen basket 20, and as shown in better detail in FIGS. 2, 4, the bottom end of the pipe 64 is closed as by means of a pipe cap 66, and the pipe is vertically slotted as indicated at 68. Thus during normal operation of the screening device, and while the screen basket 20 is being driven to rotate as explained hereinabove, the pump control valves are set so that the pump draws screened water up through the conduit 15 and thence through conduits 36, 38 and into the heat reclaimer 18 through connection 40. The discharge from the heat reclaimer 18 flows through valve 44 and thence into the discharge pipe 46 for delivery to waste as indicated at 48. Simultaneously therewith, valve 65 is opened to permit diversion of a portion of the pump discharge into the downpipe 64 whereupon it sprays laterally through the slotted portion 68 thereof and against the rotating screen basket 22 (see FIGS. 2, 4).

Figure 3:
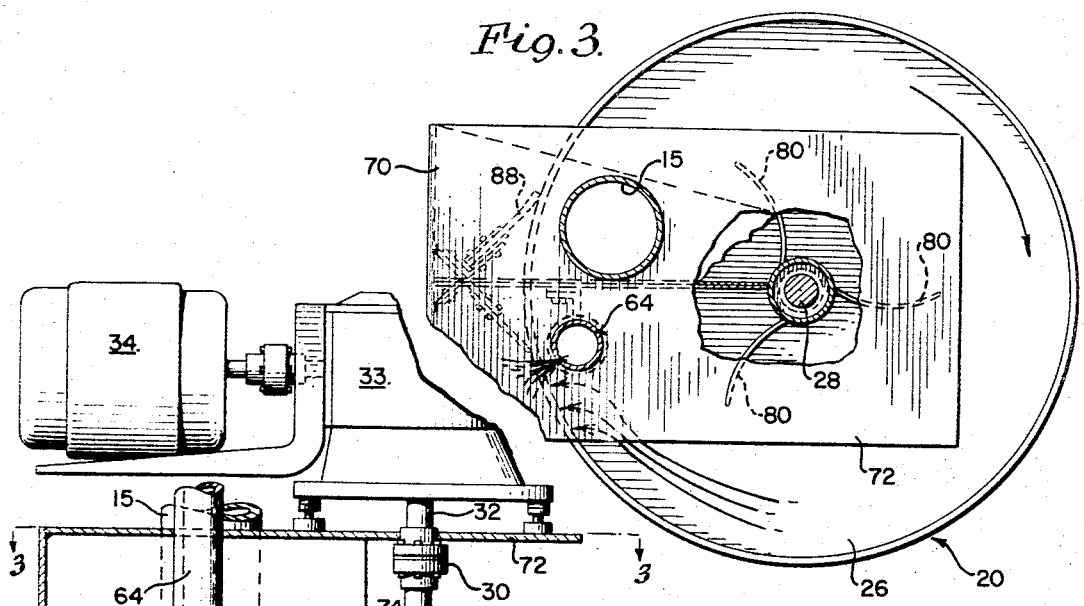
FIG. 3 is a horizontal sectional view taken on line 3—3 of FIG. 2.

The screen components of the system of the present invention may be conveniently "packaged" in unit form for installation in either an existing or newly constructed waste water system, such as shown for example in FIG. 1 of the drawing herewith. Thus, as shown in FIGS. 2–4 herein, the screening unit may be constructed to comprise a welded frame structure consisting of a back plate 70 (adapted to be bolted or otherwise fixed in vertically standing attitude against a side wall portion of the sump) and a horizontally extending top plate portion 72. One of more web plates as indicated at 74 may be welded in place as shown in FIG. 2 to brace the top plate 72 in its right-angle extending relation to the back plate, and thus to rigidize the framing structure. As best shown in FIG. 2, the screen driving gear box and motor unit are thereby conveniently based upon the top plate 72, and the drive shaft 32 extends downwardly through an aperture formed in the top plate. A guide bearing 76 for the drive shaft 28 is conveniently mounted as shown upon the web plate 74, and the lower pedestal bearing 29 is conveniently carried as shown in FIG. 2 by means of a cantilever arm bracket 78 extending rigidly from the back plate 70.

In accordance with the present invention, the screen 20 is also provided interiorly thereof with a series of vertically standing radially extending baffle or paddle plates 80 which are welded to a central hub tube which in turn is fixed as indicated at 82 to rotate with the shaft and screen assembly. The paddle devices 80 are so dimensioned and arranged as to extend short of the cylindrical wall portion of the screen, thereby clearing the suction pipe 15 and the spray pipe 64 when the screen is rotating. As shown in FIG. 3, the paddle plates 80 are preferably arcuately shaped in horizontal cross section so as to substantially carry the liquid content of the screen to rotate with the screen while at the same time operating to "plow" the liquid within the screen outwardly toward the peripheral wall thereof. This maintains a constant stirring action of the liquid inside the screen, which is accelerated by the impact of the rotary-moving material as it comes into collision with the stationary conduits 15, 64.

I also provide a novel combination scraper-rubber device as shown in better detail in FIG. 4. This mechanism comprises a sharp-edged metal scraper blade 86 and a rubber blade 88, both arranged to extend vertically in edge-bearing relation against the outer periphery of the screen surface 22; the scraper blade 86 being disposed ahead of the rubber blade when considering the direction of rotation of the screen. Mounting brackets for the scraper and rubber members are conveniently constructed to comprise angles 90–92 bolted to an angle-shaped post member 94 which is welded to back plate 70 as indicated at 96. As shown in FIG. 4, the rubber blade 88 is conveniently clamped between pressure plates 98 bolted to the angle brackets 92 as by means of machine screws 99.

In a screen system of this general type, as the suction pump operates to withdraw screened liquid from the interior of the screen 20, solids tend to accumulate against the outer surface of the screen and in the screen apertures. However, in the case of the present invention, the screen apertures, as they approach the position of the scraper-rubber devices 86, 88, are hydrodynamically bombarded from interiorly of the screen basket by pressure waves and pulsations generated by collision of the screen basket contents against the abutments presented by the stationary pipes 15, 64. This action, augmented by the jet-spraying of water from the down pipe 64 through the vertical slot 68 thereof, causes the slugs of solids tending to clog the screen apertures to be "back-pressured" and driven outwardly just prior to the time they reach the scraper blade 86. The scraper 86 then operates with optimum facility to scrape away the slugs of solid material before the pressure of flow back through the screen apertures (responding to suction of liquid through pipe 15) can operate to pull the solids back into the screen apertures. Then, as the screen rotates still further, the outside surfaces of the apertured portions of the screen are wiped against by the rubber blade 88 which operates to further disintegrate any solid accretions remaining thereon; thereby reducing any solid accumulations on the exterior of the screen to finely divided form. This combination action has been found to provide a greatly improved open-screen maintenance.

It will of course be appreciated that, although only one specific form of the invention has been illustrated and described in detail hereinabove, various changes may be made therein without departing from the spirit of the invention or the scope of the following claims.

I claim:
1. A device for cleaning liquids having accumulations of lint or the like therein, comprising, in combination,
a cylindrical screen having a perforate side wall, an open upper end and a closed bottom, and adapted to be disposed within a sump in at least partially submerged relation in the liquid therein,
means for rotating said screen about its longitudinal axis,
a stationary intake conduit projecting downwardly into said screen in closely spaced relation to the inner surface of said side wall and extending to a point just above said bottom, said intake conduit having an open bottom for withdrawing liquid from the interior of said screen,
a liquid discharge pipe projecting downwardly into said screen adjacent said inner surface thereof, said discharge pipe being parallel to said intake conduit and circumferentially spaced ahead thereof when considering the direction of rotation of said screen,
a debris scraper engaging the outer surface of said side wall along a line substanitally coextensive with and opposite to said discharge pipe, said discharge pipe having a discharge slot therein for issuing a curtain of liquid against the inner surface of said side wall substantially opposite said scraper,
and a plurality of paddles disposed radially of said longitudinal axis of said screen, said paddles being fixed for rotation with the screen and terminating in the outer edges parallel and substantially coextensive with said discharge pipe and adapted to sweep therepast in close proximity thereto.

2. The device as defined in claim 1 including a rubbing device bearing against the outer surface of said screen at a position substantially opposite said intake conduit.

References Cited
UNITED STATES PATENTS

| Re. 14,214 | 11/1916 | Akins | 210—393 |
| 963,186 | 7/1910 | Trump | 210—393 |
| 1,012,974 | 12/1911 | Bird | 210—393 |
| 1,151,999 | 8/1915 | Bird | 210—393 |
| 2,362,300 | 11/1944 | Nyman | 210—393 |
| 2,781,916 | 2/1957 | Coleman | 210—393 |

REUBEN FRIEDMAN, *Primary Examiner.*

J. ADEE, *Assistant Examiner.*